US012762675B2

(12) United States Patent
Troein et al.

(10) Patent No.: US 12,762,675 B2
(45) Date of Patent: Oct. 13, 2026

(54) CONTEXTUAL CONTENT PLACEMENT IN VIRTUAL UNIVERSES

(71) Applicant: Oracle International Corporation, Redwood Shores, CA (US)

(72) Inventors: Christopher Henric Troein, New York, NY (US); Gillian McGovern, New York, NY (US); David Perrotti, Oakland, CA (US); Eric L. Sutton, Naperville, IL (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/636,909

(22) Filed: Apr. 16, 2024

(65) Prior Publication Data

US 2025/0005617 A1 Jan. 2, 2025

Related U.S. Application Data

(60) Provisional application No. 63/510,586, filed on Jun. 27, 2023.

(51) Int. Cl.

| | |
|---|---|
| ***G06Q 30/02*** | (2023.01) |
| ***G06F 18/2325*** | (2023.01) |
| ***G06Q 30/0251*** | (2023.01) |
| ***G06T 7/00*** | (2017.01) |
| ***G06T 7/70*** | (2017.01) |

(Continued)

(52) U.S. Cl.

CPC ........ *G06T 7/0002* (2013.01); *G06F 18/2325* (2023.01); *G06Q 30/0251* (2013.01); *G06T 7/70* (2017.01); *G06T 15/10* (2013.01); *G06F 40/279* (2020.01); *G06T 2200/04* (2013.01)

(58) Field of Classification Search

CPC ......... G06T 7/0002; G06T 7/70; G06T 15/10; G06T 2200/04; G06F 18/2325; G06F 40/279; G06Q 30/0251; G06Q 30/0207–30/0277

See application file for complete search history.

(56) References Cited

U.S. PATENT DOCUMENTS

| | | | |
|---|---|---|---|
| 8,036,930 | B2 | 10/2011 | Brignull et al. |
| 8,073,803 | B2 | 12/2011 | Murdock et al. |
| 8,145,649 | B2 | 3/2012 | Murdock et al. |

(Continued)

FOREIGN PATENT DOCUMENTS

WO WO 2023-176445 A1 * 3/2023

OTHER PUBLICATIONS

"Anzu | Blended In-Game Advertising", Retrieved from https://www.anzu.io/, Retrieved on Mar. 15, 2023, p. 9.

(Continued)

*Primary Examiner* — Thuy N Nguyen

(74) *Attorney, Agent, or Firm* — Invoke

(57) ABSTRACT

Techniques for placing content in virtual universes at locations contextually compatible with the content are disclosed. A system trains a machine learning model to identify virtual environments compatible with content based on attributes representing contexts of the environments. Using the machine learning model, the system determines a contextual environment for a target content item. The system selects the particular contextual environment for placement of the target content item based on the compatibility score.

21 Claims, 8 Drawing Sheets

(51) Int. Cl.
*G06T 15/10* (2011.01)
*G06F 40/279* (2020.01)

(56) References Cited

U.S. PATENT DOCUMENTS

| | | | | |
|---|---|---|---|---|
| 8,918,328 | B2 | 12/2014 | Plachouras et al. | |
| 8,979,652 | B1 | 3/2015 | Ciszewski et al. | |
| 9,378,632 | B2 | 6/2016 | Venetianer et al. | |
| 11,010,974 | B2 | 5/2021 | Lashmar et al. | |
| 11,260,299 | B2 * | 3/2022 | Badichi | A63F 13/53 |
| 11,463,786 | B2 | 10/2022 | Ray et al. | |
| 11,697,061 | B2 | 7/2023 | Perry | |
| 11,856,272 | B2 | 12/2023 | Ray et al. | |
| 2009/0037822 | A1 * | 2/2009 | Kandekar | G06Q 10/00 715/733 |
| 2009/0063168 | A1 * | 3/2009 | Finn | G06Q 30/02 705/1.1 |
| 2012/0011002 | A1 | 1/2012 | Crowe et al. | |
| 2012/0266088 | A1 * | 10/2012 | Finn | G06F 3/1438 715/757 |
| 2012/0306873 | A1 * | 12/2012 | Sharp | A63F 13/30 345/419 |
| 2013/0124311 | A1 * | 5/2013 | Sivanandan | G06Q 30/02 705/14.51 |
| 2016/0026919 | A1 * | 1/2016 | Kaisser | G06N 5/04 706/12 |
| 2018/0059783 | A1 * | 3/2018 | van Hoff | G06F 3/013 |
| 2018/0075510 | A1 | 3/2018 | Greenberger et al. | |
| 2018/0075659 | A1 * | 3/2018 | Browy | G02B 27/0172 |
| 2018/0350144 | A1 * | 12/2018 | Rathod | H04L 51/10 |
| 2019/0206141 | A1 * | 7/2019 | Deng | G06F 3/011 |
| 2019/0272586 | A1 | 9/2019 | Huang et al. | |
| 2020/0310939 | A1 * | 10/2020 | Kußmaul | G06N 3/0499 |
| 2021/0132683 | A1 * | 5/2021 | Herling | G06F 3/011 |
| 2022/0026984 | A1 * | 1/2022 | Herling | G06F 3/011 |
| 2022/0198771 | A1 * | 6/2022 | Mayster | G06T 17/05 |
| 2022/0351281 | A1 | 11/2022 | Morgan et al. | |
| 2022/0360592 | A1 | 11/2022 | Grantham et al. | |
| 2023/0146178 | A1 * | 5/2023 | Haro | G06F 3/04847 381/303 |
| 2023/0169103 | A1 * | 6/2023 | Frazier | G06Q 10/105 707/737 |
| 2024/0062490 | A1 * | 2/2024 | Maeder | G06T 19/20 |
| 2024/0185476 | A1 | 6/2024 | Palamadai et al. | |
| 2024/0296643 | A1 * | 9/2024 | Woodard, Jr. | G06T 19/20 |
| 2024/0320928 | A1 * | 9/2024 | Bailey | G06T 19/006 |
| 2024/0331025 | A1 * | 10/2024 | Agrawal | G06Q 30/0275 |
| 2025/0061472 | A1 | 2/2025 | Kabra et al. | |
| 2025/0245025 | A1 | 7/2025 | Gendreau et al. | |

OTHER PUBLICATIONS

"The world's most advanced in-game advertising platform", Anzu, Retrieved from https://www.anzu.io/, Retrieved on Sep. 12, 2023, p. 9.

Colormatics, "VR Advertising is Changing the Future of Marketing (Here's How)", retrieved from https://www.colormatics.com/article/vr-advertising-is-changing-the-future-of-marketing/, available on Aug. 30, 2022. (Year: 2022).

* cited by examiner

CONTEXTUAL CONTENT PLACEMENT IN VIRTUAL UNIVERSES

BENEFIT CLAIMS; RELATED APPLICATIONS; INCORPORATION BY REFERENCE

This application claims the benefit of U.S. Provisional Patent Application No. 63/510,586, filed Jun. 27, 2023, that is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure generally relates to presenting content in virtual universes and, more particularly, to presenting relevant content to users based on attributes of different environments within a virtual universe.

BACKGROUND

Virtual universes allow people to socialize and interact in computer-generated environments. Examples of virtual universes include virtual reality games, immersive social platforms, training simulations, and virtual worlds for research and experimentation. A virtual universe may, for example, represent a city using three-dimensional (3D) graphics that simulate interactive landscapes, flora, fauna, characters, buildings, vehicles, and other objects. Using a computer interface, a user may control an avatar within a virtual universe to explore and interact with other users, objects, and content.

As virtual universes become more common, advertisers are increasingly placing promotional content in virtual locations. The immersive nature of virtual universes enable advertisers to gather granular information about consumers' preferences, behaviors, and interactions. By applying such granular information, advertisers can generate more effective advertising with higher returns on investment.

The approaches described in this section are approaches that could be pursued, but not necessarily approaches that have been previously conceived or pursued. Therefore, unless otherwise indicated, one should not assume that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. One should note that references to "an" or "one" embodiment in this disclosure are not necessarily to the same embodiment, and they mean at least one. In the drawings.

DETAILED DESCRIPTION

Figure 1A:
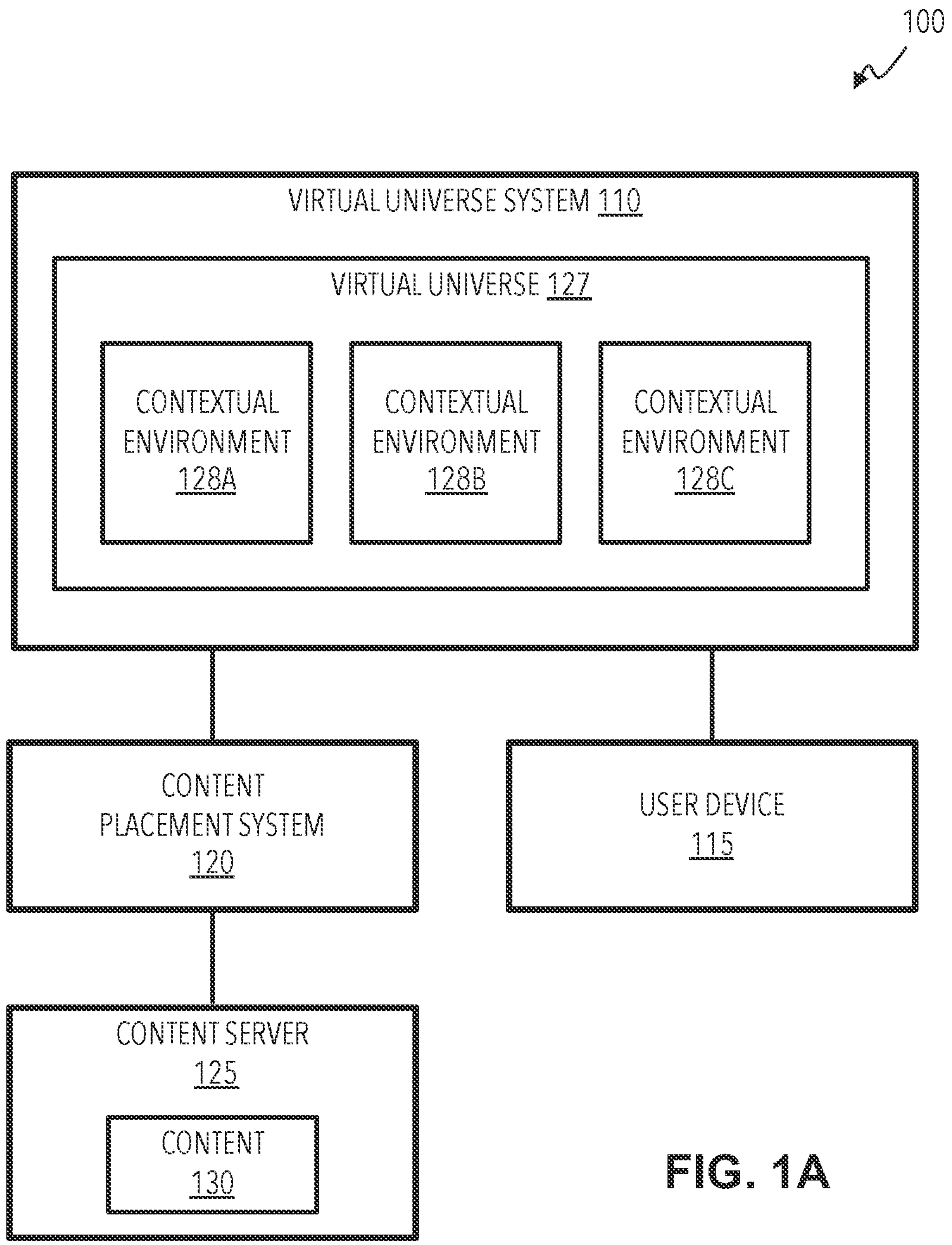
FIG. 1A illustrates an example content placement architecture in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CONTENT PLACEMENT ARCHITECTURE
3. CONTENT PLACEMENT SYSTEM
4. CLUSTERING OF CONTEXTUAL ENVIRONMENTS IN A VIRTUAL UNIVERSE
5. PLACING CONTENT IN CONTEXTUAL ENVIRONMENTS USING A CLUSTERING-TYPE CONTENT PLACEMENT MODEL
6. SELECTING CONTEXTUAL ENVIRONMENTS USING A SUPERVISED CONTENT PLACEMENT MODEL
7. EXAMPLE EMBODIMENT OF CONTENT PLACEMENT
8. HARDWARE OVERVIEW
9. MISCELLANEOUS; EXTENSIONS

1. General Overview

One or more embodiments place content in virtual universes at locations contextually compatible with the content. A virtual universe can include numerous environments. The environments can have a context distinguished by purpose, theme, setting, users, activities, and sentiment. For example, a contextual environment may be a virtual arcade that includes amusement games containing family-friendly thematic elements. Another contextual environment may be a virtual casino that includes gambling devices containing adult-themed elements. Accordingly, content intended for users in one environment may not be appropriate for users of another environment.

One or more embodiments determine a contextual environment for placing content using a clustering-type machine learning model. A system computes a target feature vector representing a target contextual environment that places the content. The system applies the machine learning model to the target feature vector that clusters the target feature vector in a same cluster as a particular feature vector representing a particular contextual environment. Responsive to determining that the target feature vector is clustered in a same cluster as the particular feature vector, the system selects the particular contextual environment for the placement of the content in the virtual universe.

One or more embodiments determine a contextual environment for placing a content item using a supervised machine learning model. A system trains the machine learning model by obtaining training data sets that include a feature vector representing a content item, a feature vector representing a particular contextual environment of a virtual universe, and a compatibility score indicating a compatibility between the content item and the contextual environment. Based on the training data sets, the system trains the machine learning model to generate compatibility scores between content items and contextual environments. For a target content item, the system generates a target feature vector representing the target content item. The system identifies a candidate contextual environment and generates a contextual feature vector representing the candidate contextual environment. Using the machine learning model, the system computes a compatibility score using the target feature vector and the contextual feature vector. The system selects the candidate context contextual environment for placement of the target content item based on the compatibility score.

One or more embodiments described in this Specification and/or recited in the claims may not be included in this General Overview section.

2. Content Placement Architecture

FIG. 1A illustrates an example content placement architecture 100 in accordance with aspects of the present disclosure. The content placement architecture 100 includes a virtual universe system 110, a user device 115, a content placement system 120, and a content server 125. In one or more embodiments, the content placement architecture 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

The virtual universe system 110 is one or more computing devices that generate, update, manage, and control a virtual universe 127. The virtual universe 127 is a computer-generated representation of a three-dimensional, interactive world that simulates real-world or fictional environments. For example, the virtual universe 127 can be a metaverse, a game, a social platform, a training or education system, or a research, development, test and evaluation platform. Additionally, the virtual universe 127 incorporates elements of physical and social interactions that model natural phenomena, interactions, and behaviors among users, characters, objects, and other elements of the virtual universe 127.

The virtual universe 127 includes multiple contextual environments 128A, 128B, and 128C. A contextual environment 128 is a portion or subset of the virtual universe 127 that may have a context different than other contextual environments 128 within the virtual universe 127. As used herein, "context" refers to themes, circumstances, conditions, users, or information comprising a particular environment 128 as well as objects, entities, content, user behaviors, and sentiments occurring in the particular environments 128. For example, contextual environment 128A may represent a family-friendly arcade, contextual environment 128B may represent a virtual kitchen, and contextual environment 128C may represent a virtual sporting event. Therefore, the locations comprising environments 128A, 128B, and 128C involve different themes, objects, user demographics, behaviors, activities, and interactions.

The user device 115 is one or more computing devices communicatively linked with the virtual universe system 110 that interacts with the virtual universe 127. The user device 115 may be a personal computer, workstation, server, mobile device, mobile phone, tablet device, and/or other processing device capable of implementing and/or executing software, applications, etc. The user device 115 generates a computer-user interface that enables a user to access, perceive, and interact with the virtual universe 127 using input/output devices, such as a video display, an audio apparatus, a pointer device, a keyboard device, and/or a tactile feedback device.

The content placement system 120 is one or more computing devices communicatively linked with the virtual universe system 110 that determines environments 128 for placement of content based on the contexts of the environments 128. Additionally, the content placement system 120 stores attributes of the environments 128 based on respective metadata, context information, and user data of the environments 128. Using the attributes, the content placement system 120 applies a machine learning model to select a contextual environment 128 to present content.

The content server 125 is one or more computing devices communicatively linked with the content placement system 120. The content server 125 maintains a database of content 130 produced by one or more content providers. The content server 125 may serve items of the content 130 ("content items") to the content placement system 120 for placement in the virtual universe system 110. Content 130 includes digital material such as text, images, graphics, videos, animations, and/or audio. Subject matter of the content 130 can include informational, entertainment, educational, social, and promotional material. For example, the content 130 can be digital advertisements designed to attract and engage target audiences in the virtual universe 127.

3. Content Placement System

Figure 1B:
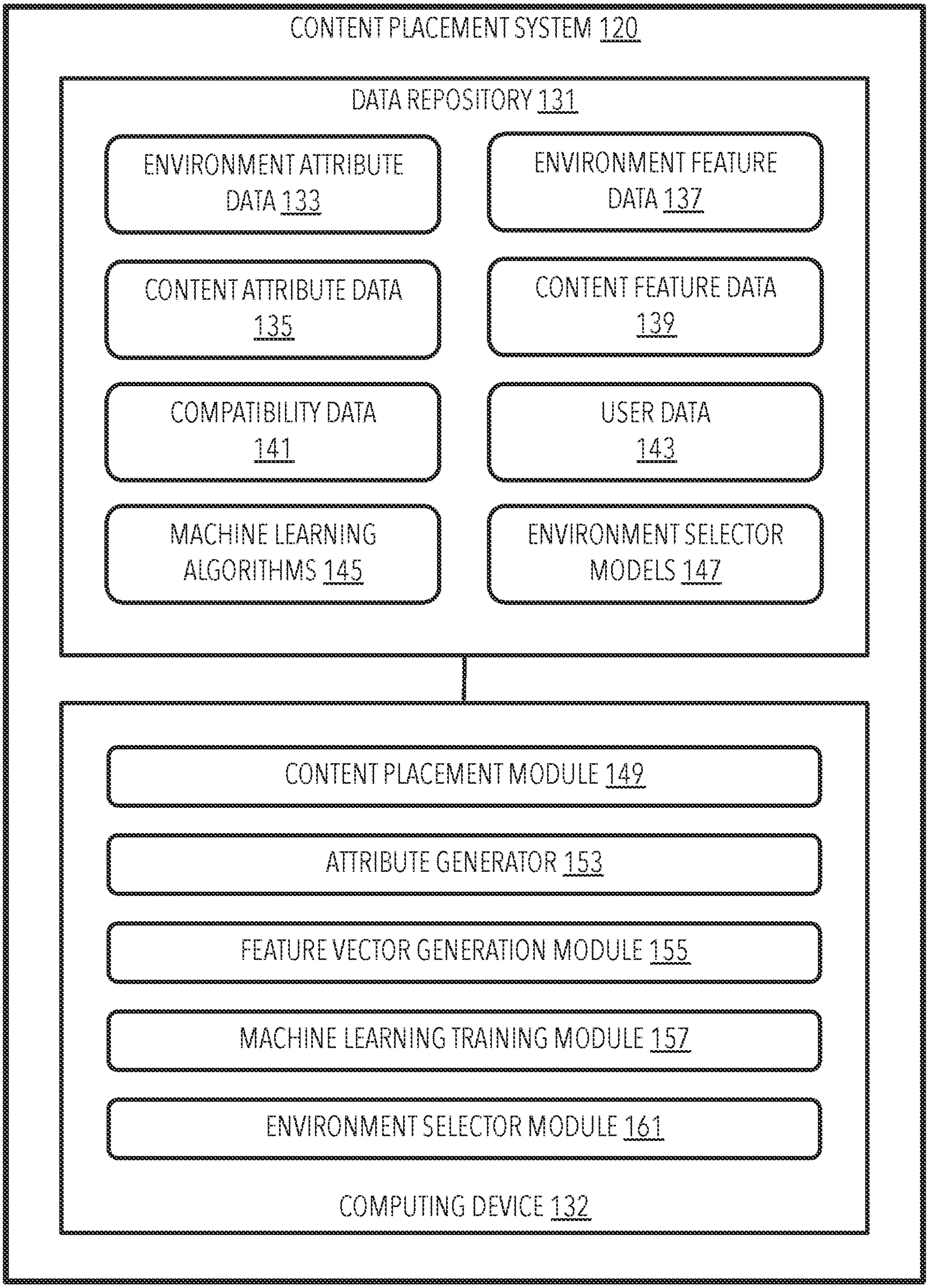
FIG. 1B illustrates a content placement system in accordance with one or more embodiments.

FIG. 1B is a block diagram illustrating an example content placement system 120 in accordance with one or more embodiments. The content placement system 120 includes hardware and software that perform processes and functions described herein. In one or more embodiments, the content placement system 120 may include more or fewer components than the components illustrated in FIG. 1B. The components illustrated in FIG. 1B may be local to or remote from each other. The components illustrated in FIG. 1B may be implemented in software and/or hardware. Each component may be distributed over multiple applications and/or machines. Multiple components may be combined into one application and/or machine. Operations described with respect to one component may instead be performed by another component.

One or more embodiments of the content placement system 120 include a data repository 131 and a computing device 132. The data repository 131 includes any type of storage unit and/or device (e.g., a file system, database, collection of tables, or any other storage mechanism) for storing data. Further, a data repository 131 may include multiple different storage units and/or devices. The multiple different storage units and/or devices may or may not be of the same type or located at the same physical site. Further, the data repository 131 may be implemented or executed on the same computing system as content placement system 120. Additionally, or alternatively, the data repository 131 may be implemented or executed on a computing system separate from content placement system 120. The data repository 131 may be communicatively coupled, wired and/or wirelessly, to the content placement system 120 via a direct connection or via a network.

In one or more embodiments, the data repository 131 stores environment attribute data 133, content attribute data 135, environment feature data 137, content feature data 139, compatibility data 141, user data 143, machine learning algorithms 145, and environment selector models 147. The environment attribute data 133, content attribute data 135, environment feature data 137, content feature data 139, compatibility data 141, user data 143, machine learning algorithms 145, and environment selector models 147 may be implemented across any of the components within the content placement architecture 100.

The environment attribute data 133 is one or more data structures associating contextual environments 128 with corresponding environment attributes. The environment attributes include characteristics or properties of the contextual environments 128. The environment attributes can be numeric values or text. In one or more embodiments, the virtual universe system 110 generates the environment attributes for the contextual environments 128 and transmits the environment attributes to the content placement system 120. For example, the virtual universe system can maintain a set of environment attributes for the individual contextual environments. Additionally, or alternatively, the virtual universe system 110 can generate the environment attributes by scraping keywords from metadata, software code, and content of the contextual environments using natural language processing (NLP) and image recognition techniques. The metadata can include information, code, objects, and user information associated with a particular contextual environment 128. The metadata associated with objects and users can describe sentiment information and user-interaction information. Example environment attribute data 133 include the following: type, subject matter, theme, demographics, class, sub-class, activity (e.g., retail, education, social, entertainment etc.), environment type (e.g., first person shooter, cooperative, solo), theme (e.g., amusement, competition, education), environment (rural, urban, park, ocean, jungle, etc.), activity (e.g., build, explore, conflict, cook, socialize, etc.), average user age, user gender split, language, culture, age restriction (e.g., G, PG, PG-13, R, and NC-17.), brand restrictions, product, sentiment, and subject matter restrictions.

The content attribute data 135 includes one or more data structures associating content with attributes of content 130. The content attributes include characteristics or properties of the contextual environments 128. The content attribute data 135 include characteristics or properties of the items of content 130. In one or more embodiments, the content server 125 generates the content attribute data 135 for items of content and transmits the attributes to the content placement system 120. For example, the content server 125 can include a profile for the items of content 130. Additionally, or alternatively, the virtual universe system 110 generates the content attributes by extracting information from metadata, software code, and content of the contextual environments. An example set of content attributes can be the same or similar to the example environment attributes above.

Feature vectors include one-dimensional arrays containing attributes. The elements of a feature vector correspond to a respective attribute. The feature vectors are applied as inputs to the machine learning algorithms 145 for training the machine learning models 147 to represent a point in a multidimensional feature space, where the individual dimensions represents a different attribute. The arrangement of points in the feature space captures the relationships between different attributes. In one or more embodiments, the environment feature data 137 include environment feature vectors generated for individual contextual environments 128 using the environment attribute data 133. The content feature data 139 includes content feature vectors generated for items of content 130 using the content attribute data 135.

The compatibility data 141 include one or more data structures associating compatibility scores with respective pairs of environment feature data 137 and content feature data 139. A compatibility score is a metric quantifying the compatibility of a particular item of content 130 with a particular contextual environment 128. In one or more embodiments, the compatibility scores are assigned by subject matter experts based on data collected from placement of content in a contextual environment. In other embodiments, the compatibility scores that are calculated by the content placement system 120 are based on the historical metrics of past content placements. The metrics can be performance parameters of advertising campaigns that represent advertisement impressions or conversions generated by an item of content after placement in a particular environment.

The user data 143 includes one or more data structures with information describing users of the virtual universe 127. The users can be operators of avatars such as a user of the user device 115. The user data 143 can include usernames, contact information, and demographic information. The user data 143 can also include virtual profile information, such as actions or behaviors by a user avatar within the virtual universe 127, characteristics of environments explored by the target user avatar in the metaverse, or characteristics of other avatars that the target user avatar interacted with. The user data 143 can also include information describing past actions taken by users to engage in purchase activity and interests in topics previously expressed by the users. The user data 143 can further include commercial profile information, such as spending habits, e-commerce purchases, interests/hobbies, etc., of users outside of a virtual environment. Moreover, the user data 143 can include demographic, psychographic, and behavioral characteristics. For example, behavioral characteristics in the virtual universe can include risk-taking, goal-completion, and social rankings.

The machine learning algorithms 145 are algorithms that can be iterated to train a target machine learning model that maps a set of input variables to an output variable. In particular, a machine learning algorithm 145 is configured to generate and/or train environment selector models 147. A machine learning algorithm 145 generates a target model such that the target model best fits the datasets of training data to the labels of the training data. Additionally, or alternatively, a machine learning algorithm 145 generates a target model such that when the target model is applied to the datasets of the training data, a maximum number of results determined by the target model matches the labels of the training data. Different target models may be generated based on different machine learning algorithms and/or different sets of training data.

The environment selector model 147 can be machine learning models trained to identify candidate contextual environments 128 for placing and presenting particular content items. The environment selector models 147 include supervised components and/or unsupervised components.

Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, computing device 132 includes hardware and/or software configured to perform operations described herein. Example operations are described below with reference to FIGS. 2, 3, 4A, and 4B. The computing device 132 executes computer-readable program instructions, such as an operating system and application programs, that are stored in memory devices and/or the storage system. Moreover, the computing device 132 executes program instructions of a content placement module 149, an attribute generator 153, a feature vector generation module 155, a machine learning training module 157, and an environment selector module 161.

The content placement module 149 places content 130 in compatible contextual environments 128 of the virtual universe 127. The content placement module 149 may place the content 130 in a contextual environment 128 in response to a request from the virtual universe system 110 to fill an available content location in a contextual environment 128. For example, in response to determining that content currently displayed in the contextual environment 128A is scheduled to expire, the virtual universe system 110 can generate a request for new content from the content placement system 120. Additionally, or alternatively, the content placement module 149 may place content in a contextual environment 128 in response to receiving the content item from the content server 125. For example, the content server 125 can provide content 130 to the content placement system from a pool, queue, or schedule of content.

The attribute generator 153 generates attributes from metadata, software code, and content of the contextual environments 128. The attribute generator 153 can extract environment attributes and content attributes by parsing metadata, code, and object libraries of the contextual environments 128 and content 130 to identify keywords included in predefined keyword libraries. Additionally, the attribute generator 153 can scrape audio, video, images, and text from within the contextual environments 128 and content 130 using natural language processing (NLP) and image recognition techniques. For example, the attribute generator can identify physical characteristics of objects on the contextual environment, such as vehicles, buildings, mountains, lakes, flora, and fauna. The attribute generator 153 can also analyze text captured from rendered images of a virtual automobile dealership environment to identify keywords, such as auto, truck, SUV, service, sale, financing, etc. Further, the system can generate environment attributes by parsing user data 143 and data libraries of users inhabiting the contextual environments 128. For example, the system can extract terms from users' lists of achievements, rewards, and inventories. Moreover, one or more embodiments can perform classification processing (e.g., using a trained machine learning model) to infer additional keywords.

The feature vector generator module 155 generates feature vectors for application to the machine learning algorithms 145 to train the environment selector models 147. For example, the feature vector generation module 155 can generate an environment feature vector and a content feature vector by extracting corresponding attributes from the environment attribute data 133 and content attribute data 135. These features can include, for example, type, subject matter, theme, demographics, and one or more contexts. Example features can include class, sub-class, type, activity, setting, brand, and subject matter. Class can include, for example, sports, amusement, education, retail, etc. Sub-class can include a subset of a class, such as football, baseball, soccer, etc. Type can include, for example, first person shooter, amusement, gambling, etc. Activity can include, for example, build, explore, conflict, cook, socialize, etc. Setting can include, for example, rural, urban, park, ocean, jungle, etc. Age restriction can include, for example, e.g., G, PG, PG-13, R, and NC-17. Brand can include brand restrictions, such as competing stores or manufacturers. Subject matter can include subject matter restrictions, such as violence, politics, foul language, disparaging content, etc.

The machine learning training module 157 trains one or more machine learning models to select contextual environments 128. An environment selector models 147 can be trained using environment feature data 137 and content feature data 139 generated using environment attribute data 133 and the content attribute data 135 as well as weights or other labels applied to the various data. Once trained, the environment selector module 161 may identify and select contextual environment 128 for placement of content, as described below.

The environment selector module 161 selects a particular contextual environment 128 to place content 130 by applying an environment selector model 147 to environment feature data 137 and/or content feature data 139. Some embodiments of the environment selector module 161 identify several candidate contextual environments 128 for a target content item. The environment selector module 161 can determine a ranked list of candidate environment and select highest ranked environment.

4. Clustering of Contextual Environments in Virtual Universes

Figure 2:
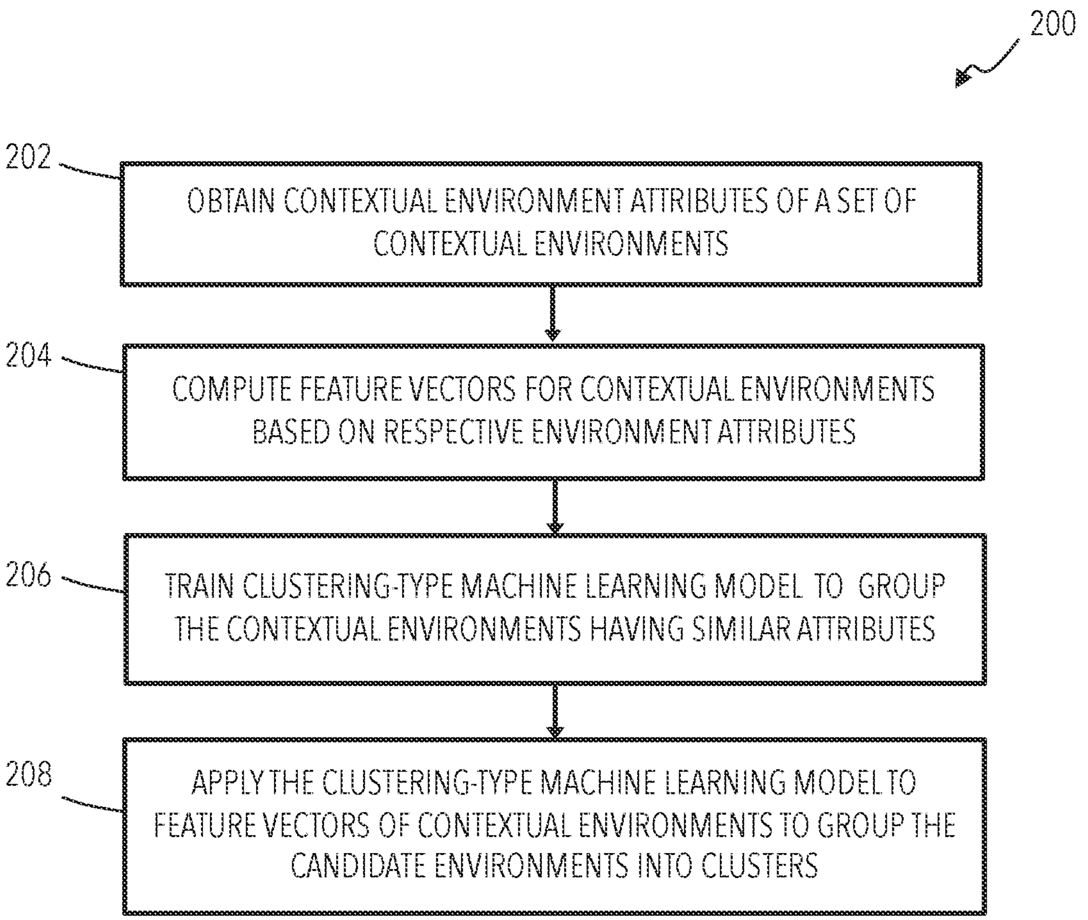
FIG. 2 illustrates an example set of operations for training a clustering-type content placement model in accordance with one or more embodiments.

FIG. 2 illustrates example operations of a process (200) for training a clustering-type machine learning model to select contextual environments of a virtual universe to place content in accordance with one or more embodiments. One or more operations illustrated in FIG. 2 may be modified, rearranged, or omitted. The particular sequence of operations illustrated in FIG. 2 should not be construed as limiting the scope of one or more embodiments.

A system obtains and stores environment attributes of a set of contextual environments for training the clustering-type machine learning model (Operation 202). The system can obtain the environment attributes from a repository or other data store that maintains sets of contextual environment attributes. Additionally, or alternatively, the system can generate environment attributes based on the respective metadata, operational data, content, and user data of individual contextual environments.

The system computes and stores feature vectors based on respective contextual environment attributes of the contextual environments (Operation 204). The attributes of a particular feature vector can include keywords extracted from a particular contextual environment. The keywords can include attributes, such as physical characteristics, scraped from code and images of the contextual environment. For example, the system can scrape keywords, such as auto, truck, SUV, service, sale, deal, financing, etc., from object models and rendered images of a virtual automobile dealership. Using transformation techniques, the system can combine some or the entire set of environment attributes into feature vectors for corresponding contextual environments.

The system trains a clustering-type machine learning model for grouping contextual environments into clusters (Operation 206). Training a clustering-type machine learning model includes grouping the contextual environments into clusters based on patterns or similarities within the environment attributes of the individual contextual environments. The clustering-type machine learning model can be trained using a clustering algorithm, such as K-Means, Hierarchical Clustering, DBSCAN, and Gaussian Mixture Models (GMM). The system trains the selected model by inputting the feature vectors of the contextual environments into the selected algorithm. Training the model includes applying individual feature vectors to the selected clustering algorithm to partition the data points into distinct groups or clusters based on their similarities. The algorithm evaluates the distance between feature vectors, aiming to maximize intra-cluster similarity while minimizing inter-cluster similarity. The distance metric can be calculated using, for example, a Euclidean distance, Manhattan distance, or cosine similarity, among others, to quantify the dissimilarity between feature vectors and clusters by measuring the geometric or algebraic separation between them within the feature space. The model adjusts the algorithm's parameters and iteratively refines the model. The algorithm groups similar data points together to train the model by teaching the algorithm to determine clusters based on the feature vectors. The algorithms partition the data into subsets, or clusters, where the within a cluster are more similar to each other than to instances in other clusters. This iterative process continues until a convergence criterion is met, indicating stability in the clustering assignments. The final output of the clustering algorithm is a set of clusters containing data points that are considered similar based on the features in their respective feature vectors.

The system applies the trained clustering-type machine learning model to feature vectors of contextual environments of a particular virtual universe to group the candidate contextual environments into clusters (Operation 208). The candidate contextual environments are the set of contextual environments of the virtual universe where content may be placed. For the candidate contextual environments in the virtual universe, the system can generate respective feature vectors in the same or similar manner to that described above. Using the feature vectors of the candidate contextual environments is inputs, the trained clustering-type machine learning model partition the data points of each feature vectors into one of the clusters based on the distance between feature vectors by maximizing intra-cluster similarity and minimizing inter-cluster similarity. As described above, the distance can be calculated using, for example, a Euclidean distance, Manhattan distance, or cosine similarity. The output of the indicating the cluster group to candidate contextual environments belongs. By applying the clustering-type machine learning model to the feature vectors, the model groups the contextual environments within the above-determined clusters.

Figure 3:
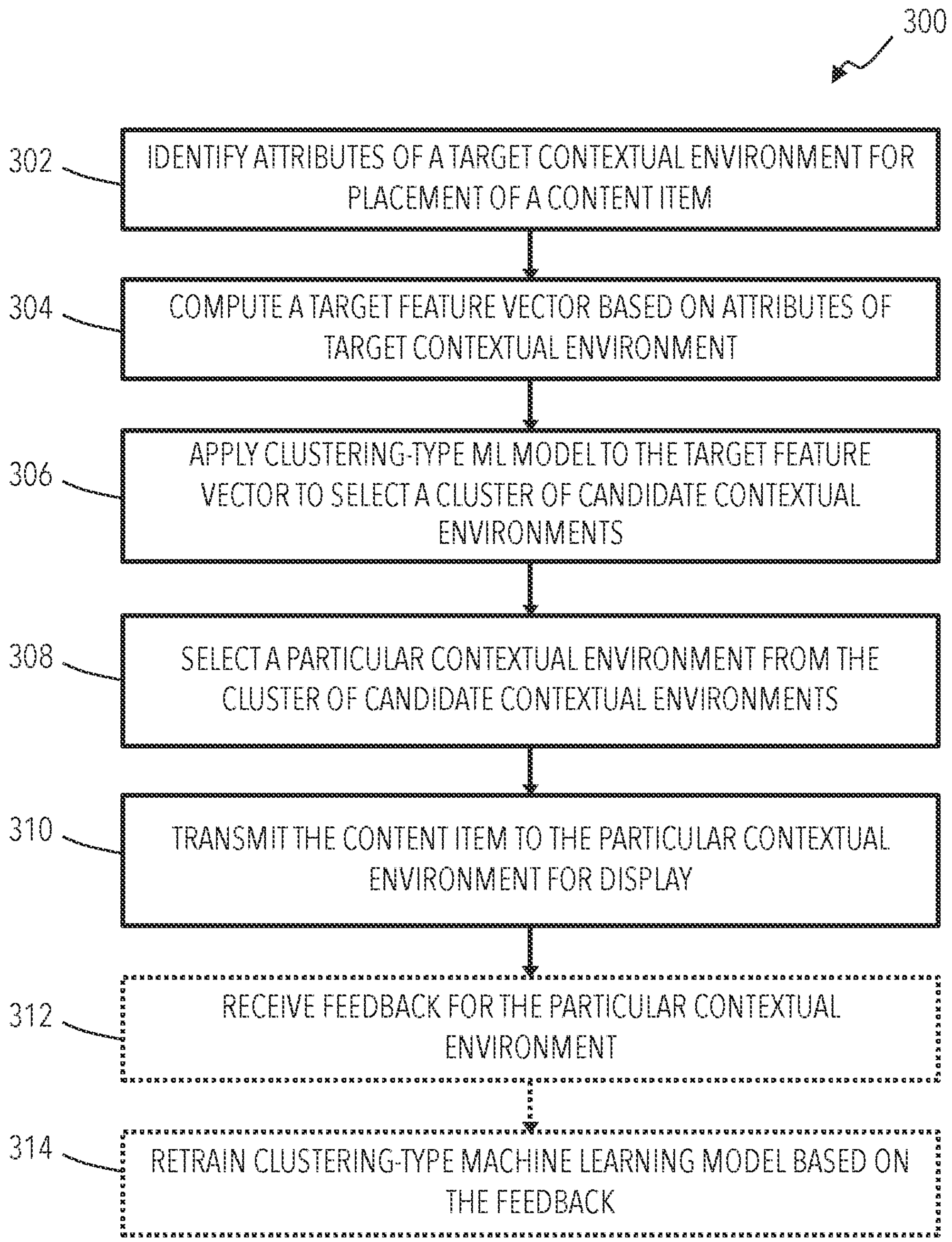
FIG. 3 illustrates an example set of operations for training a clustering-type machine learning model to select contextual environments of a virtual universe to place content in accordance with one or more embodiments.

5. Placing Content in Contextual Environments Using a Clustering-Type Content Placement Model FIG. 3 illustrates an example set of operations for a process (300) of placing content in contextual environments of a virtual universe using a clustering-type placement model in accordance with one or more embodiments. One or more operations illustrated in FIG. 3 may be modified, rearranged, or omitted. Accordingly, the particular sequence of operations illustrated in FIG. 3 should not be construed as limiting the scope of one or more embodiments.

The system identifies attributes of a target contextual environment for placement of a content item (Operation 302). The system can identify the attributes of a target contextual environment based on a content item for placement in a virtual universe. For example, the system may obtain the content item from a content provider in response to a request from a virtual universe system to fill an available content location. The system may also obtain and store content attributes of the content item. As described above, the content attributes can include keywords indicating the content item's type, subject matter, theme, demographics, and contexts. Additionally, or alternatively, the system can analyze the content item to generate attributes using, for example, natural language processing (NLP) and image recognition techniques.

The system generates a target feature vector based on attributes of the target contextual environment (Operation 304). Generating the target feature vector can include accessing environment attributes of multiple environments. The system can combine the selected features into a feature vector for the individual environments, wherein the elements of the vector represent a feature.

The system applies a clustering-type machine learning model to the target feature vector to select a cluster of candidate contextual environments (Operation 306). The clustering algorithm then uses a target feature vector to group similar data points into clusters based on the patterns the model was trained to identify. The output of the clustering algorithm is a set of candidate contextual environments previously grouped by the model into the same cluster as the target contextual environment. For example, the clustering-type model can include five clusters of contextual environments, each cluster including one or more contextual environments included in the virtual universe. By applying the target feature vector to the clustering-type model, the system determines that the target contextual environment is grouped in the first of the five clusters. Based on the grouping, the system determines that the first cluster includes a set of one or more candidate contextual environment similar to the target contextual environment.

The system selects a particular contextual environment from the set of candidate contextual environments (Operation 308). In one or more embodiments, the system ranks the candidate contextual environments based on similarity to the target contextual environment. The system can determine the ranking by calculating a similarity metric or distance measure using, for example, a cosine similarity function or calculating a Euclidean Distance between the feature vector of the target contextual environment and the respective contextual environment in the set of candidate contextual environments. Additionally, or alternatively, the system can determine a similarity between the environmental attributes of the target contextual environment and the contextual environments in the set of candidate contextual environments. The system can pick the candidate contextual environment having the highest rank to place the content item. Based on the selection, the system places a content item in the particular contextual environment (Operation 310). Placing the content includes transmitting the content item to a virtual universe system with information indicating the particular contextual environment and/or identifying a location (e.g., target object) to place the content item.

The system can continuously monitor the performance of the selected actions and reassess the clusters as new data becomes available. Clustering models may need periodic retraining to adapt to changing patterns. The system receives feedback for the content placed in the selected contextual environment (Operation 312). The feedback can be obtained by assessing the output by an operator of a content placement system and/or content providers that evaluate placement of content in environments. The feedback can be generated based on direct observation of content items placed in environments and/or performance metrics (e.g., impressions and conversions) of the content items placed in environments. For example, a content provider may observe that the model place an advertisement for beer placed in a family-themed environment. The feedback can be obtained by determining evaluation metrics that measure the quality and effectiveness of the clustering model. Example metrics include silhouette score, Davies-Bouldin index, and the like. For example, the system ca calculate the silhouette score for each data point in the dataset based on its distance to other data points within the same cluster and its distance to data points in neighboring clusters. The silhouette score ranges from −1 to 1, where a higher score indicates better cluster cohesion and separation.

The system retrains the clustering-type machine learning model based on the feedback (Operation 314). Based on the received feedback and evaluation metrics, the system updates the model based on new or different training data. Additionally, updating model can include the iteratively refining clustering assignments through incremental adjustments or optimizations to the parameters of the model. This adjustments can involve updating cluster centroids, revising clustering boundaries, or modifying clustering parameters to better align with the underlying data patterns and objectives. The frequency of model updates depends on the rate of change in the underlying patterns of the data. In some cases, models may be updated periodically, while in others, they may support continuous learning with incremental updates.

Figure 4A:
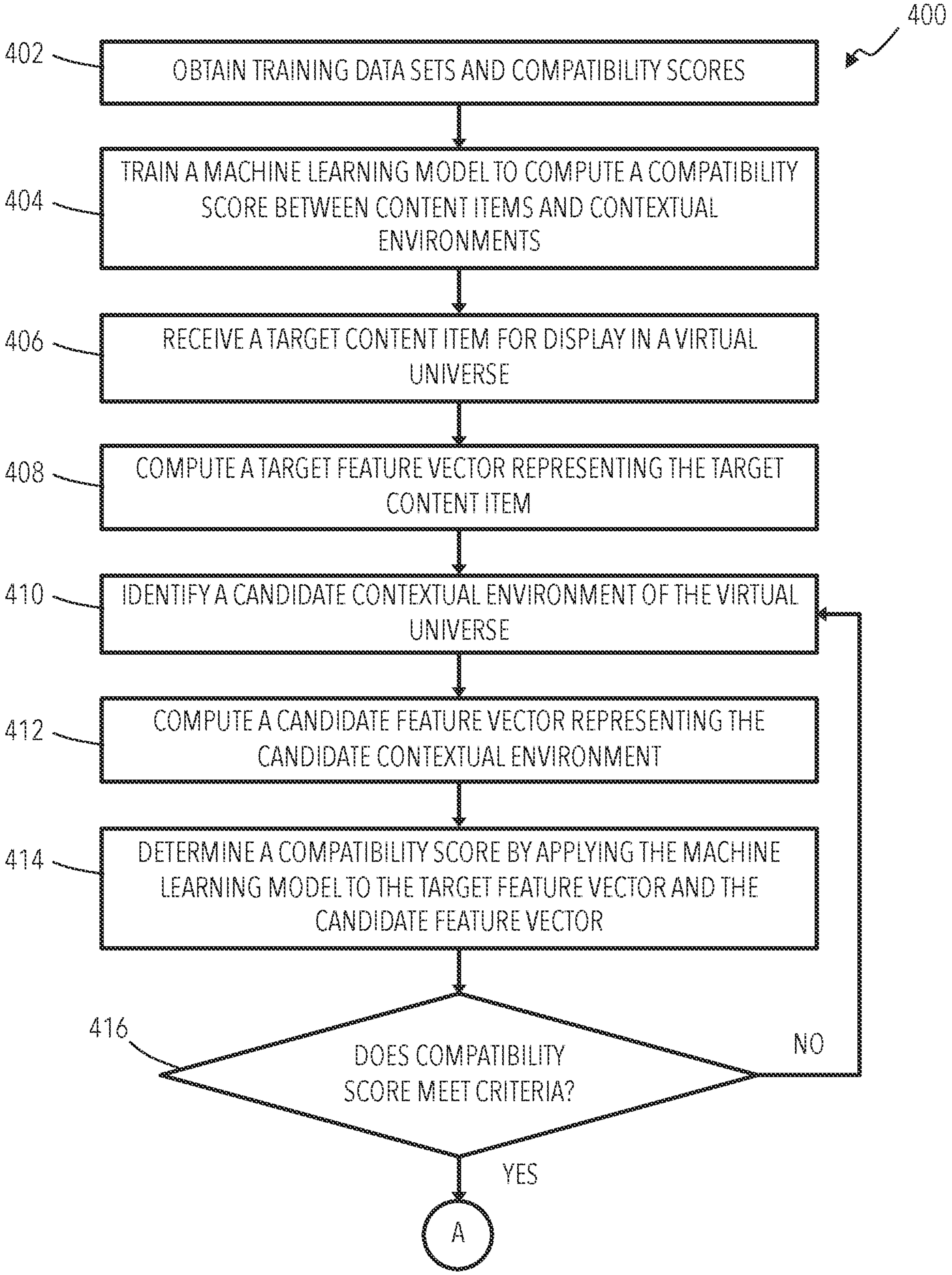
FIGS. 4A and 4B illustrate an example set of operations for placing content in a virtual universe using a supervised machine learning model in accordance with one or more embodiments.
Figure 4B:
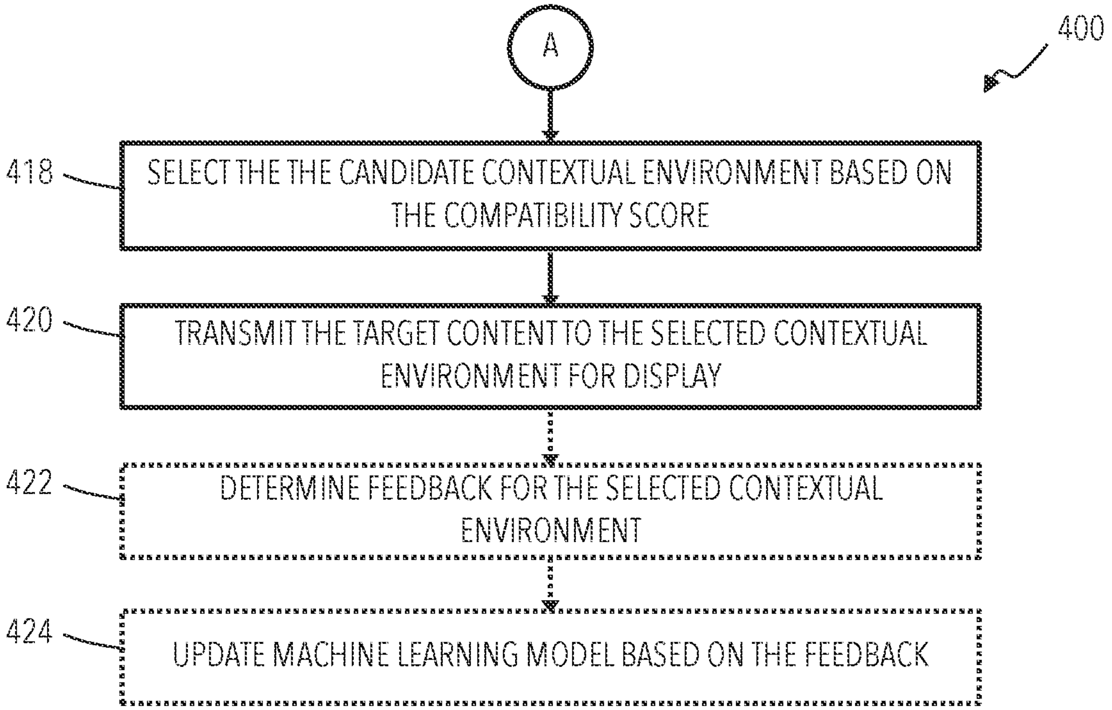

6. Selecting Contextual Environments Using a Supervised Content Placement Model FIGS. 4A and 4B illustrate an example set of operations for a process (400) of placing content in a virtual universe using a supervised content placement model in accordance with one or more embodiments. One or more operations illustrated in FIGS. 4A and 4B may be modified, rearranged, or omitted. Accordingly, the particular sequence of operations illustrated in FIGS. 4A and 4B should not be construed as limiting the scope of one or more embodiments.

A system obtains training datasets and compatibility scores for training an environment selector model (Operation 402). The training datasets include a training set of feature vectors representing attributes of contextual environments and attributes of content objects. As described above, the system can obtain the attributes from a data repository. Additionally, or alternatively, the system generates the attributes by scraping keywords extracted from environments and content using NLP and image processing techniques. Individual elements of the vector represent a specific attribute or feature. Additionally, the training data sets can also include compatibility scores indicating compatibility between respective environment feature vectors and content feature vectors. As described above, an individual, such as a subject matter expert, can assign the compatibility scores. Additionally, or alternatively, a computing system calculates the compatibility scores based on the historical performance metrics of past content placements.

The system trains a machine learning model to compute a compatibility scores between content items and respective candidate contextual environments (Operation 404). The system trains the machine learning model by applying the training dataset to a supervised learning algorithm. The algorithm can be, for example, a linear regression algorithm or a random forest algorithm. The algorithm iteratively learns the relationship between the input feature vectors and the compatibility scores.

The system receives a target content item for display in a virtual universe (Operation 406). The target content item can be, for example, a short film, an educational video, or a promotional display to be placed in a compatible environment of the virtual universe. Some embodiments receive the content item from a content provider in response to a request from a virtual universe system to fill an available content location. The system can also receive content attributes corresponding to the content item. As detailed previously, the content attributes can include keywords that describe characteristics, properties, contexts, and target users of the content item.

The system computes a target feature vector representing the target content item (Operation 408). Generating the feature vector can include accessing environment attributes of multiple environments. Using the environment attributes, the system selects a set of environmental attributes for determining the target feature vector and combines the selected environment attributes into a feature vector for the environment.

The system identifies a candidate contextual environment of the virtual universe (Operation 410). The system analyzes a set of context environments included in the virtual universe to identify candidate contextual environments. Some embodiments select the candidate contextual environment from a list of contextual environments included in the virtual universe. In large virtual universes, for example, the system can pre-filter the list of contextual environments based on metadata associated with the target content item. For example, the system can filter the list based on "type" information to lower the quantity of candidates.

The system computes a candidate feature vector representing the identified candidate contextual environment (Operation 412). The system generates the candidate feature vector based on attributes of the candidate contextual environment in a same or similar manner to that previously described above regarding the target feature vector. Computing the candidate feature vector includes representing a set of attributes as a single numerical vector.

The system determines a compatibility score by applying the machine learning model trained to determine the compatibility score to the target feature vector and the candidate feature vector (Operation 414). The system uses the feature vector of the target content item and the feature vector of the candidate contextual as inputs to the machine learning model score. As described above, the system obtains the compatibility score as an output of the model.

The system determines if the compatibility score meets placement criteria (Operation 416). The placement criteria includes certain conditions or thresholds set by the criteria. For example, criteria might specify a range of acceptable scores, a minimum threshold, or specific conditions that should be met. The conditions can be one or more predetermined threshold values. The system can include logic that calculates if the obtained compatibility score satisfies one or more of the criteria rules. For example, the rules can include the following: the score is greater than a specified threshold, consider that score acceptable; the score falls within a certain range, the score meets the criteria; and the score does not meet predefined conditions. If the compatibility score does not meet criteria (Operation 416 is "No"), then the process (400) iteratively repeats by identifying another candidate contextual environment, as described above (Operation 411). On the other hand, if the compatibility score meet criteria (Operation 416 is "Yes"), then the system selects the candidate contextual environment based on the compatibility score (Operation 418). The system then places a content item in the particular contextual environment (Operation 420). Placing the content includes transmitting the content item to a virtual universe system with information indicating the particular contextual environment.

The system determines feedback for the selected contextual environment (Operation 422). Determining feedback can include obtaining assessments of the output by an operator of a content placement system and/or content providers that evaluate placement of content in environments, as described above. Determining feedback can also include comparing the determined compatibility score to known outcomes in a set of training data. The difference between the current compatibility score and the known outcome can be quantified using a loss function. For example, the loss function can determine a metric quantifying a deviation from the known outcomes and revise attributes associated with a deviation. Additionally, determining feedback can also include determining an evaluation metrics such as accuracy, precision, recall, F1-score, or area under the receiver operating characteristic curve (ROC-AUC).

Using the feedback, the system updates the machine learning model based on the feedback (Operation 424). Updating the machine learning model can include re-engineering the content of the feature vectors. Additionally, the updating can include tuning parameters of the model using techniques such as grid search, random search, or Bayesian optimization. For example, a grid search search a predefined set of hyperparameter values for a machine learning model to identify an optimal combination that yields the best performance. Using the updated training data, feature vectors, and parameters, the system can iteratively retrain the machine learning model.

7. Example Embodiment of Content Placement

Figure 5:
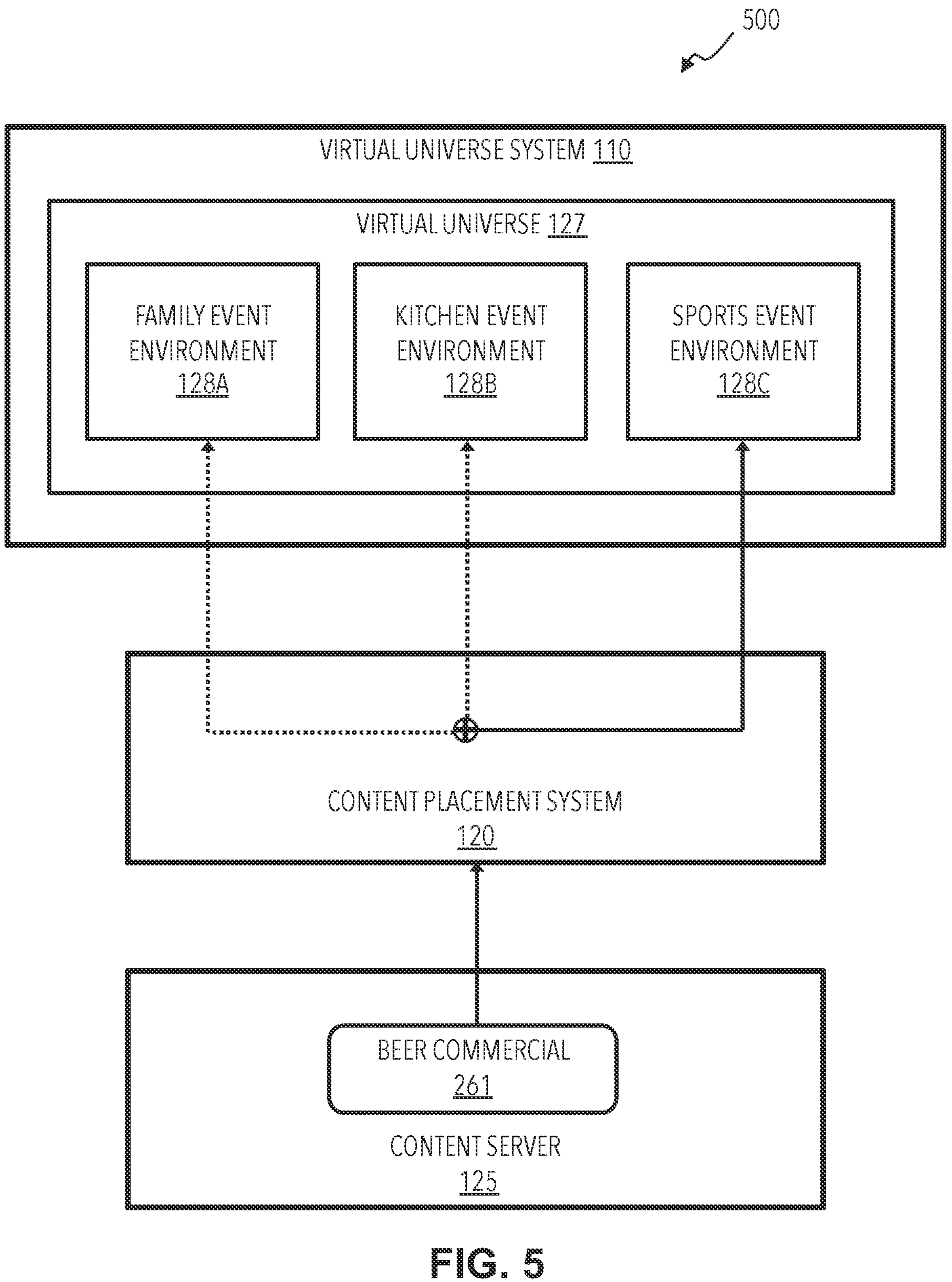
FIG. 5 illustrates an example of placing content in a virtual universe using a supervised content placement model in accordance with one or more embodiments.

FIG. 5 shows a functional block diagram illustrating an example process (500) of placing content in a contextual environment of a virtual universe in accordance with one or more embodiments. The example is described for purposes of clarity. Components and/or operations described below should be understood as one specific example that may not be applicable to certain embodiments. Accordingly, components and/or operations described below should not be construed as limiting the scope of any of the claims.

The system involves a virtual universe system 110, a content placement system 120, a content server 125, and a virtual universe 127 that can be the same as those previously described above. In the present example, the virtual universe 127 includes three contextual environments: a family event contextual environment 128A, a kitchen event contextual environment 128B, and a sports event contextual environment 128C. The contextual environments 128A, 128B, and 128C include a location configured to display content. For example, the contextual environments 128A, 128B, and 128C can each include an object, such as virtual billboards, including a location configured to display promotional content sourced from advertisers via the content server 125.

In the present example, the item of content is a beer commercial 261 to be placed in the virtual universe by the content placement system 120. In some embodiments, the virtual universe system 110 outputs a request for content. The content request triggers the content placement system 120 to obtain the beer commercial 261 and determines one of the environments 128 for placement of the content based on the respective contexts of the environments 128. In some other embodiments, the content placement system 120 places the beer commercial 261 in response to receiving the commercial from the content server 125.

The beer commercial 261 is associated with a set of content attributes, including descriptive information, demographic information, and contextual information. As described above, the content server can transmit the content attributes of the beer commercial 261 to the content placement system 120. Additionally, or alternatively, the content placement system 120 can determine the content attributes by scraping the metadata, code, and content of the beer commercial 261 to extract keywords. For example, content of the beer commercial 261 can be a video depicting men aged 21 or older opening cans of beer while sitting on the tailgate of a truck in front of a football stadium. Using screen capture, image recognition, and NLP techniques, the content placement system can determine keywords by identifying text, objects, and physical characteristics corresponding to the content. For example, the content attributes of the beer commercial can include the following keywords: Acme Beer Corp, alcohol, men, truck, the truck's brand and model, football, stadium, outdoors, etc.

The contextual environments 128 also have environment attributes. As described above, the virtual universe system 110 transmits the environment attributes of environments 128 to the content placement system 120. Additionally, or alternatively, the content placement system 120 determines the environment attributes by scraping the code and content to extract keywords. For example, using screen capture, image recognition, and NLP techniques, the content placement system can determine keywords by identifying text, objects, and physical characteristics corresponding to the family event contextual environment 128A, the kitchen event contextual environment 128B, and the sports event contextual environment 128C.

Based on the attributes, the content placement system 120 selects an environment 128 for receiving a content item using a machine learning model. As described above in FIG. 3, in some embodiments, the machine learning model is a clustering-type model. The content placement system 120 can generate a target feature vector based on attributes of a target contextual environment such as the sport event environment 128C. Then, by applying the clustering type of machine learning model to the target feature vector, the content placement system 120 selects a particular contextual environment. That means, based on the attributes of the target environment, the clustering type of machine learning model would group the target feature vector with an environment having similar target feature of actors. The group might include several different candidate contextual environments. For example, three additional, unique events (a sporting event, a racetrack, and a football game) may be in the same cluster as the sports event, whereas the family event and cooking show would have attributes that would place them in different clusters than the sporting event. The system can select one of the candidate Tatian moments included in the cluster for the beer commercial. The selection can be done based on a ranking system that could determine how close the feature vector of the beer is. Commercial is to the featured actors of the candidate environments.

As also described above, regarding FIGS. 4A and 4B, in some embodiments, the machine learning model is a supervised model trained to compute a compatibility score between content items and contextual environments. In the present example, the system determines a compatibility score between a feature vector of the beer commercial 261 and the feature vectors of the environments 128A, 128B, and 128C. Based on the value compatibility score, the system determines whether or not the score satisfies criteria. For example, the rules can include any of the following: if the score is greater than a specified threshold, consider the score acceptable; if the score falls within a certain range, the score meets the criteria; if the score does not meet predefined conditions, flag the score as unacceptable. Alternatively, the system can rank the contextual environments based on the compatibly scores and select the highest ranking score.

In the present example, the compatibly score of the beer commercial with the family event would be presumably low, so the family event would not be selected for placement of the beer commercial, whereas compatibly scores of the sport event environment 128C would be relatively high. This is because the attribute of the target content item would be similar to the attributes of the beer commercial 261. Accordingly, as illustrated in FIG. 5, the content placement system 120 would place the beer commercial in the sporting events contextual environment at a predetermined content location.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
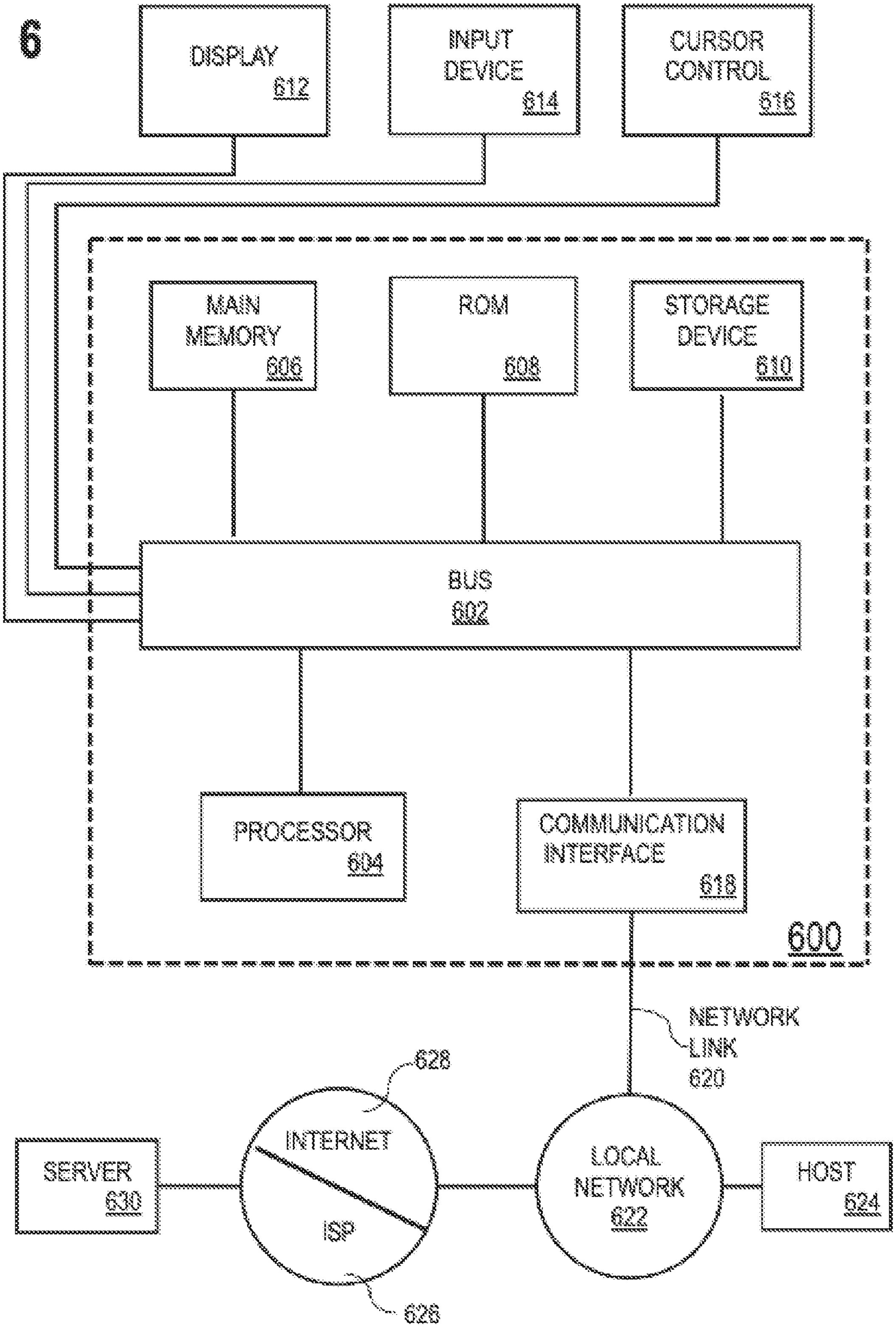
FIG. 6 shows a block diagram that illustrates a computer system in accordance with one or more embodiments.

For example, FIG. 6 is a block diagram that illustrates a computer system 600 where an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk, optical disk, or a Solid State Drive (SSD) is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic that, in combination with the computer system, causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into the dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from where processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618 that carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as the code is received, and/or stored in storage device 610, or other non-volatile storage for later execution.

9. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form where such claims issue, including any subsequent correction.

What is claimed is:

1. One or more non-transitory computer readable media comprising instructions that, when executed by one or more hardware processors, cause the one or more hardware processors to perform operations comprising:

extracting, during execution of a virtual universe, contextual attributes of a plurality of contextual environments of the virtual universe;

applying a clustering-type machine learning model to a plurality of feature vectors representing the contextual attributes of the plurality of contextual environments to group the plurality of contextual environments into a plurality of clusters;

computing a target feature vector representing contextual attributes of a target contextual environment in the virtual universe for placement of a target content item on a virtual object being rendered in the virtual universe;

applying the clustering-type machine learning model to the target feature vector to group the target contextual environment into one of the plurality of clusters;

determining that the clustering-type machine learning model clustered the target contextual environment based on the target feature vector in a same cluster as a particular contextual environment of the plurality of contextual environments;

selecting the particular contextual environment for the placement of the target content item in the virtual universe; and causing a modification of the particular contextual environment, in real-time during execution of the virtual universe, to display the target content item on a particular virtual object rendered within the particular contextual environment of the virtual universe.

2. The one or more non-transitory computer readable media of claim 1, wherein extracting contextual attributes of the plurality of contextual environments comprises:

identifying keywords associated with the plurality of contextual environments by:

identifying physical characteristics corresponding to the plurality of contextual environments by scraping content data of the plurality of contextual environments; and determining the keywords based on the physical characteristics.

3. The one or more non-transitory computer readable media of claim 1, wherein the operations further comprise identifying keywords associated with the plurality of contextual environments based on one or more of:

metadata associated with the plurality of contextual environments;

metadata associated with objects included in the plurality of contextual environments; and code associated with the plurality of contextual environments.

4. The one or more non-transitory computer readable media of claim 3, wherein:

the metadata associated with the plurality of contextual environments and the metadata associated with the objects comprise sentiment information.

5. The one or more non-transitory computer readable media of claim 1, wherein the operations further comprise identifying keywords associated with the plurality of contextual environments based on metadata associated with user behavior, the metadata indicating one or more of:

user risk-taking behavior information, user goal-completion behavior information, and user spending behavior information.

6. The one or more non-transitory computer readable media of claim 1, wherein the plurality of contextual environments comprise sub-environments of the virtual universe.

7. A method comprising:

extracting, during execution of a virtual universe, contextual attributes of a plurality of contextual environments of the virtual universe;

applying a clustering-type machine learning model to a plurality of feature vectors representing the contextual attributes of the plurality of contextual environments to group the plurality of contextual environments into a plurality of clusters;

computing a target feature vector representing contextual attributes of a target contextual environment in the virtual universe for placement of a target content item on a virtual object being rendered in the virtual universe;

applying the clustering-type machine learning model to the target feature vector to group the target contextual environment into one of the plurality of clusters;

determining that the clustering-type machine learning model clustered the target contextual environment based on the target feature vector in a same cluster as a particular contextual environment of the plurality of contextual environments;

selecting the particular contextual environment for the placement of the target content item in the virtual universe; and causing a modification of the particular contextual environment, in real-time during execution of the virtual universe, to display the target content item on a particular virtual object rendered within the particular contextual environment of the virtual universe.

8. The method of claim 7, wherein extracting contextual attributes of the plurality of contextual environments comprises:

identifying keywords associated with the plurality of contextual environments by:

identifying physical characteristics corresponding to the plurality of contextual environments by scraping content data of the plurality of contextual environments; and determining the keywords based on the physical characteristics.

9. The method of claim 7, wherein the method further comprises identifying keywords associated with the plurality of contextual environments based on one or more of:

metadata associated with the plurality of contextual environments;

metadata associated with objects included in the plurality of contextual environments; and code associated with the plurality of contextual environments.

10. The method of claim 9, wherein:

the metadata associated with the plurality of contextual environments and the metadata associated with the objects comprise sentiment information.

11. The method of claim 7, further comprising identifying keywords associated with the plurality of contextual environments based on metadata associated with user behavior, the metadata indicating one or more of:

user risk-taking behavior information, user goal-completion behavior information, and user spending behavior information.

12. The method of claim 7, wherein the plurality of contextual environments comprise sub-environments of the virtual universe.

13. A system comprising:

one or more hardware processors;

one or more non-transitory computer-readable media; and program instructions stored on the one or more non-transitory computer-readable media that, when executed by the one or more hardware processors, cause the system to perform operations comprising:

extracting, during execution of a virtual universe, contextual attributes of a plurality of contextual environments of the virtual universe;

applying a clustering-type machine learning model to a plurality of feature vectors representing the contextual attributes of the plurality of contextual environments to group the plurality of contextual environments into a plurality of clusters;

computing a target feature vector representing contextual attributes of a target contextual environment in the virtual universe for placement of a target content item on a virtual object being rendered in the virtual universe;

applying the clustering-type machine learning model to the target feature vector to group the target contextual environment into one of the plurality of clusters;

determining that the clustering-type machine learning model clustered the target contextual environment based on the target feature vector in a same cluster as a particular contextual environment of the plurality of contextual environments;

selecting the particular contextual environment for the placement of the target content item in the virtual universe; and causing a modification of the particular contextual environment, in real-time during execution of the virtual universe, to display the target content item on a particular virtual object rendered within the particular contextual environment of the virtual universe.

14. The system of claim 13, wherein extracting contextual attributes of the plurality of contextual environments comprises:

identifying keywords associated with the plurality of contextual environments by:

identifying physical characteristics corresponding to the plurality of contextual environments by scraping content data of the plurality of contextual environments; and determining the keywords based on the physical characteristics.

15. The system of claim 13, wherein the operations further comprise identifying keywords associated with the plurality of contextual environments based on one or more of:

metadata associated with the plurality of contextual environments;

metadata associated with objects included the plurality of contextual environments; and code associated with the plurality of contextual environments.

16. The system of claim 15, wherein:

the metadata associated with the plurality of contextual environments and the metadata associated with the objects comprise sentiment information.

17. The system of claim 13, wherein the operations further comprise identifying keywords associated with the plurality of contextual environments based on metadata associated with user behavior, the metadata indicating one or more of:

user risk-taking behavior information, user goal-completion behavior information, and user spending behavior information.

18. The system of claim 13, wherein the plurality of contextual environments comprise sub-environments of the virtual universe.

19. The one or more non-transitory computer readable media of claim 1, wherein selecting the particular contextual environment for the placement of the target content item comprises:

identifying a subset of the plurality of contextual environments that are in the same cluster as the target contextual environment; and selecting the particular contextual environment, from the subset of the plurality of contextual environments based on similarity between contextual environments in the subset and the target contextual environment.

20. The one or more non-transitory computer readable media of claim 1, wherein the clustering-type machine learning model is trained by:

obtaining feature vectors of a plurality of training contextual environments; and applying a clustering algorithm to the feature vectors to partition the plurality of training contextual environments into clusters by maximizing intra-cluster similarity and minimizing inter-cluster similarity based on a distance metric computed between the feature vectors.

21. The one or more non-transitory computer readable media of claim 1, wherein extracting contextual attributes of the plurality of contextual environments comprises:

scraping keywords corresponding to the plurality of contextual environments by:

applying one or more of screen capture, image recognition, or natural language processing (NLP) techniques to content rendered in the plurality of contextual environments to identify one or more of text, objects, or physical characteristics of the plurality of contextual environments; and determining the keywords corresponding to the plurality of contextual environments based on the one or more of text, objects, or physical characteristics of the plurality of contextual environments.

* * * * *